(12) United States Patent
Suzuki

(10) Patent No.: US 8,184,336 B2
(45) Date of Patent: May 22, 2012

(54) IMAGE PROCESSING DEVICE, IMAGE PROCESSING METHOD, AND COMPUTER-READABLE RECORD MEDIUM FOR IMAGE PROCESSING

(75) Inventor: Nobuhiko Suzuki, Aichi (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 790 days.

(21) Appl. No.: 12/275,640

(22) Filed: Nov. 21, 2008

(65) Prior Publication Data

US 2009/0135440 A1 May 28, 2009

(30) Foreign Application Priority Data

Nov. 22, 2007 (JP) ................. 2007-303032

(51) Int. Cl.
H04N 1/387 (2006.01)
H04N 1/04 (2006.01)
G06K 1/00 (2006.01)
(52) U.S. Cl. .................. 358/1.9; 358/453; 358/486
(58) Field of Classification Search .................. None
See application file for complete search history.

(56) References Cited

U.S. PATENT DOCUMENTS

| 7,437,018 B1* | 10/2008 | Amirghodsi | 382/293 |
| 7,663,783 B2* | 2/2010 | Yamakawa | 358/3.1 |
| 2002/0196472 A1* | 12/2002 | Enomoto | 358/3.26 |

FOREIGN PATENT DOCUMENTS

| JP | 2001-016428 | 1/2001 |
| JP | 2001-061039 | 3/2001 |
| JP | 2003-319150 | 11/2003 |
| JP | 2004-032510 A | 1/2004 |
| JP | 2004032510 A * | 1/2004 |
| JP | 2005-039484 | 2/2005 |

OTHER PUBLICATIONS

JP Office Action dtd Nov. 17, 2009, JP Appln. 2007-303032, English translation.

* cited by examiner

Primary Examiner — Twyler Haskins
Assistant Examiner — Christopher D Wait
(74) Attorney, Agent, or Firm — Banner & Witcoff, Ltd.

(57) ABSTRACT

An image processing device comprises an image processing unit capable of executing multiple types of image processing (differing in the amount of pixel loss caused to an image edge) to an image as a processing target, a specifying unit which specifies image processing that should be executed by the image processing unit from the multiple types of image processing, and a target image extending unit which extends the area of the image as the processing target depending on the amount of pixel loss to be caused by the image processing specified by the specifying unit. The image processing unit executes the image processing specified by the specifying unit to the image whose area has been extended by the target image extending unit.

14 Claims, 15 Drawing Sheets

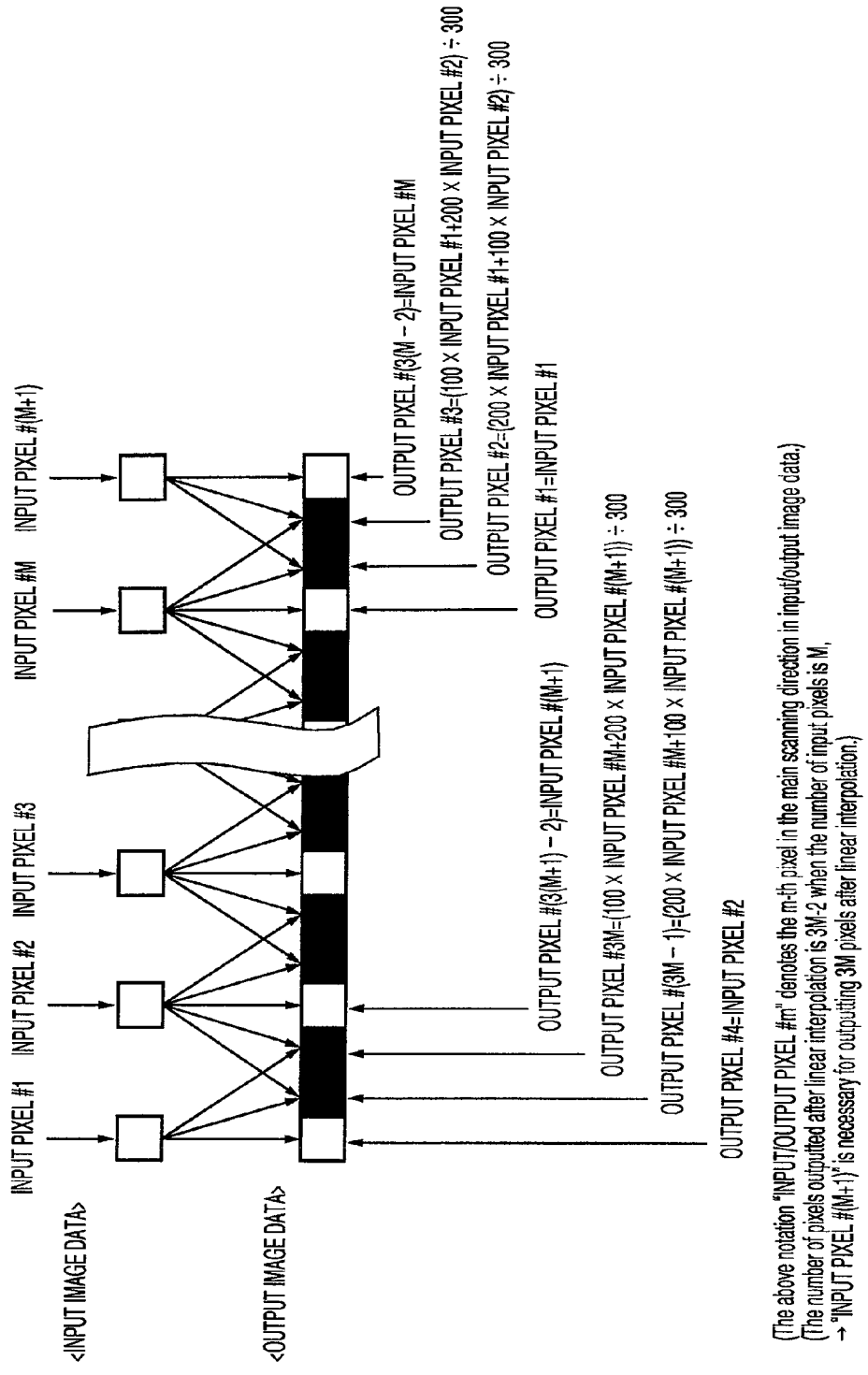

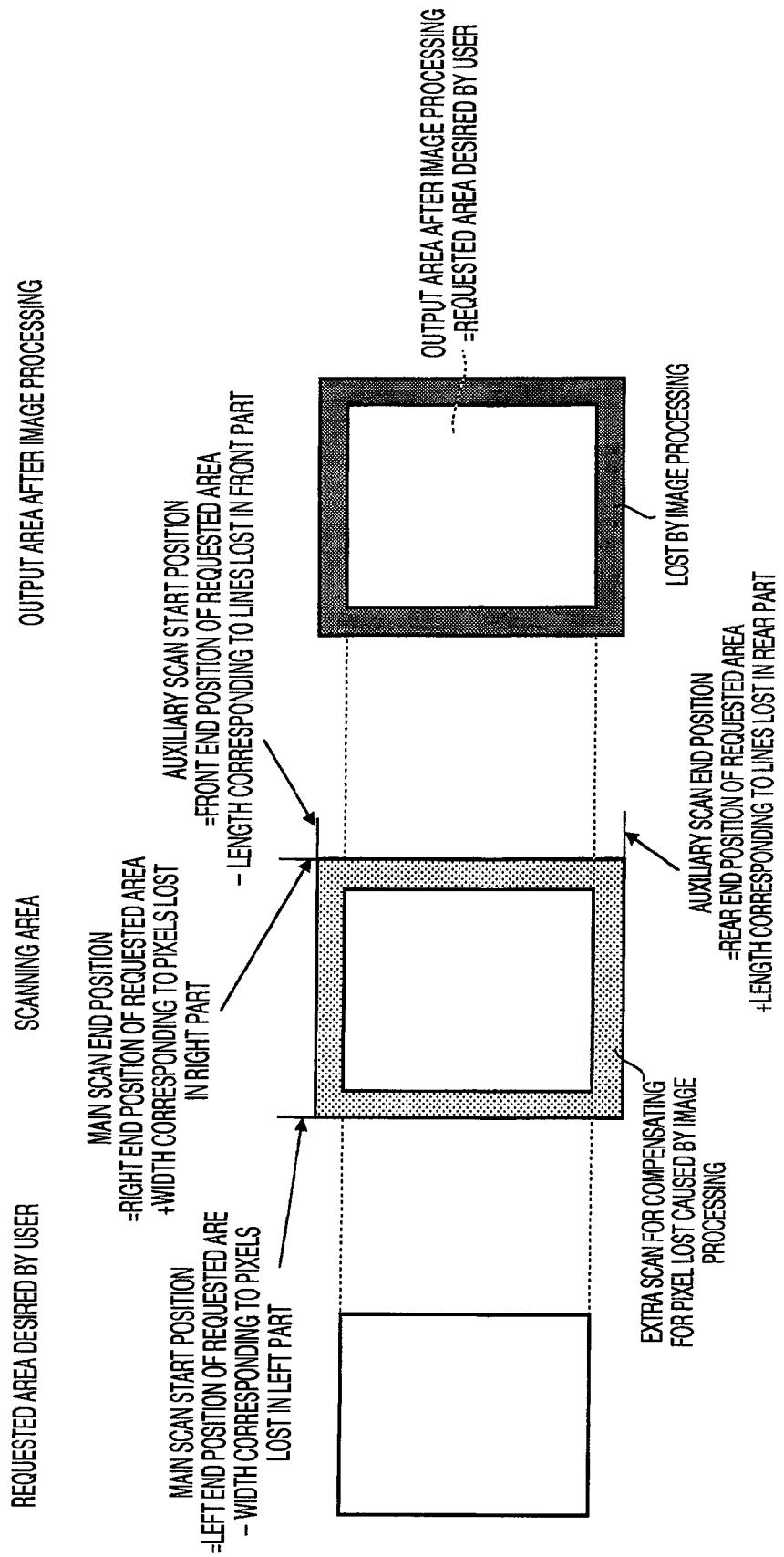

IMAGE PROCESSING DEVICE, IMAGE PROCESSING METHOD, AND COMPUTER-READABLE RECORD MEDIUM FOR IMAGE PROCESSING

CROSS-REFERENCE TO RELATED APPLICATION

This application claims priority under 35 U.S.C. §119 from Japanese Patent Application No. 2007-303032 filed on Nov. 22, 2007. The entire subject matter of the application is incorporated herein by reference.

BACKGROUND OF THE INVENTION

The present invention relates to an image processing device and an image processing method for executing multiple types of image processing, differing in the amount of pixel loss caused to an image edge, to an image as the processing target, and a computer-readable record medium storing a program for the image processing.

A variety of image processing devices capable of executing image processing to an image as the processing target (PC (Personal Computer), MFP (Multi-Function Peripheral), printer, etc.) are widely known and available today. The image as the processing target can be acquired by use of an image scanner like the one described in Japanese Patent Provisional Publication No. 2001-61039 (hereinafter referred to as a "patent document #1"), for example. The image scanner of the patent document #1, which executes document image scanning by feeding a document to an image scanning position, carries out extra image scanning (for a prescribed number of lines) when the document feeding is stopped and temporarily skips the image scanning (for a prescribed number of lines) when the document feeding is restarted, in order to prevent mis-scanning and double-scanning of the document image caused by gear backlash.

SUMMARY OF THE INVENTION

Incidentally, some types of image processing involve loss of pixels at an edge of the image of output image data (after undergoing the image processing) in comparison with input image data (before undergoing the image processing) due to the nature of each processing method. For example, in a filtering process (for executing enhancing correction, smoothing correction, etc. to an image), the image is corrected by use of an image correction filter in which rates of incorporation of values of surrounding pixels (i.e. pixels surrounding a pixel under consideration) into the value of the pixel under consideration have been set. Thus, the correction can not be executed to a pixel lacking part or all of the surrounding pixels to be used for the filtering. Consequently, such pixels (for which the correction is impossible) are lost in the filtering process, that is, not outputted.

When such pixel loss at an image edge occurs during image processing, the area of the output image (after the image processing) becomes smaller than that of the input image (before the image processing).

The present invention, which has been made in consideration of the above problems, is advantageous in that an image processing device and an image processing method capable of preventing the decrease in the area of the image due to image processing can be provided. The present invention also provides a computer-readable record medium storing a program for such image processing preventing the decrease in the area of the image.

In accordance with an aspect of the present invention, there is provided an image processing device comprising an image processing unit capable of executing multiple types of image processing (differing in the amount of pixel loss caused to an image edge) to an image as a processing target, a specifying unit which specifies image processing that should be executed by the image processing unit from the multiple types of image processing, and a target image extending unit which extends the area of the image as the processing target depending on the amount of pixel loss to be caused by the image processing specified by the specifying unit. The image processing unit executes the image processing specified by the specifying unit to the image whose area has been extended by the target image extending unit.

With the image processing device configured as above, the area of the image as the processing target is extended previously (prior to the image processing by the image processing unit) in consideration of the amount of pixel loss to be caused by the image processing, by which the decrease in the area of the image due to the image processing can be prevented.

In accordance with another aspect of the present invention, there is provided a computer-readable record medium storing computer-readable instructions that cause a computer to execute an image processing step in which multiple types of image processing differing in the amount of pixel loss caused to an image edge can be executed to an image as a processing target, a specifying step of specifying image processing that should be executed by the image processing step from the multiple types of image processing, and a target image extending step of extending the area of the image as the processing target depending on the amount of pixel loss to be caused by the image processing specified by the specifying step. The image processing step executes the image processing specified by the specifying step to the image whose area has been extended by the target image extending step.

By making a computer operate according to the computer-readable instructions acquired (loaded, installed, etc.) from the record medium, effects similar to those of the image processing device described above can be achieved.

In accordance with another aspect of the present invention, there is provided an image processing method for processing an image as a processing target. The image processing method comprises an image processing step in which multiple types of image processing differing in the amount of pixel loss caused to an image edge can be executed to the image as the processing target, a specifying step of specifying image processing that should be executed by the image processing step from the multiple types of image processing, and a target image extending step of extending the area of the image as the processing target depending on the amount of pixel loss to be caused by the image processing specified by the specifying step. The image processing step executes the image processing specified by the specifying step to the image whose area has been extended by the target image extending step.

With the above image processing method, effects similar to those of the image processing device described above can be achieved.

Other objects, features and advantages of the present invention will become more apparent from the consideration of the following detailed description taken in conjunction with the accompanying drawings.

BRIEF DESCRIPTION OF THE ACCOMPANYING DRAWINGS

FIG. 7 is a schematic diagram for explaining a resolution conversion process (resolution conversion in the main scanning direction) which is executed by the MFP.

FIG. 15 is a schematic diagram for explaining a case where the image scanning area is extended to both sides in the main scanning direction and to both sides in the auxiliary scanning direction.

DETAILED DESCRIPTION OF THE EMBODIMENTS

Figure 1:
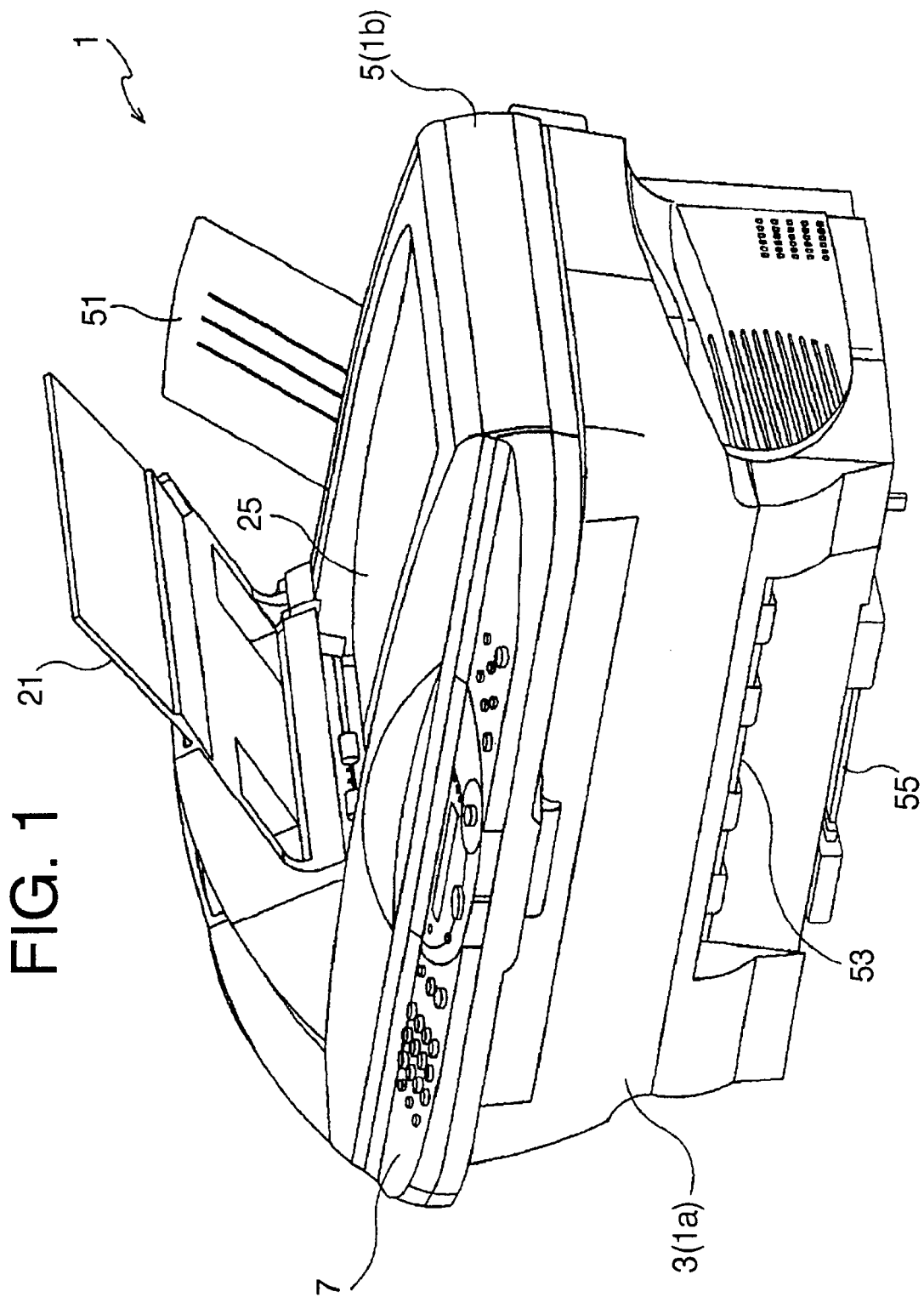
FIG. 1 is a perspective view showing the external appearance of an MFP (Multi-Function Peripheral) as an image processing device in accordance with an embodiment of the present invention.

Referring now to the drawings, a description will be given in detail of a preferred embodiment in accordance with the present invention.

<1. Overall Composition>

Figure 2:
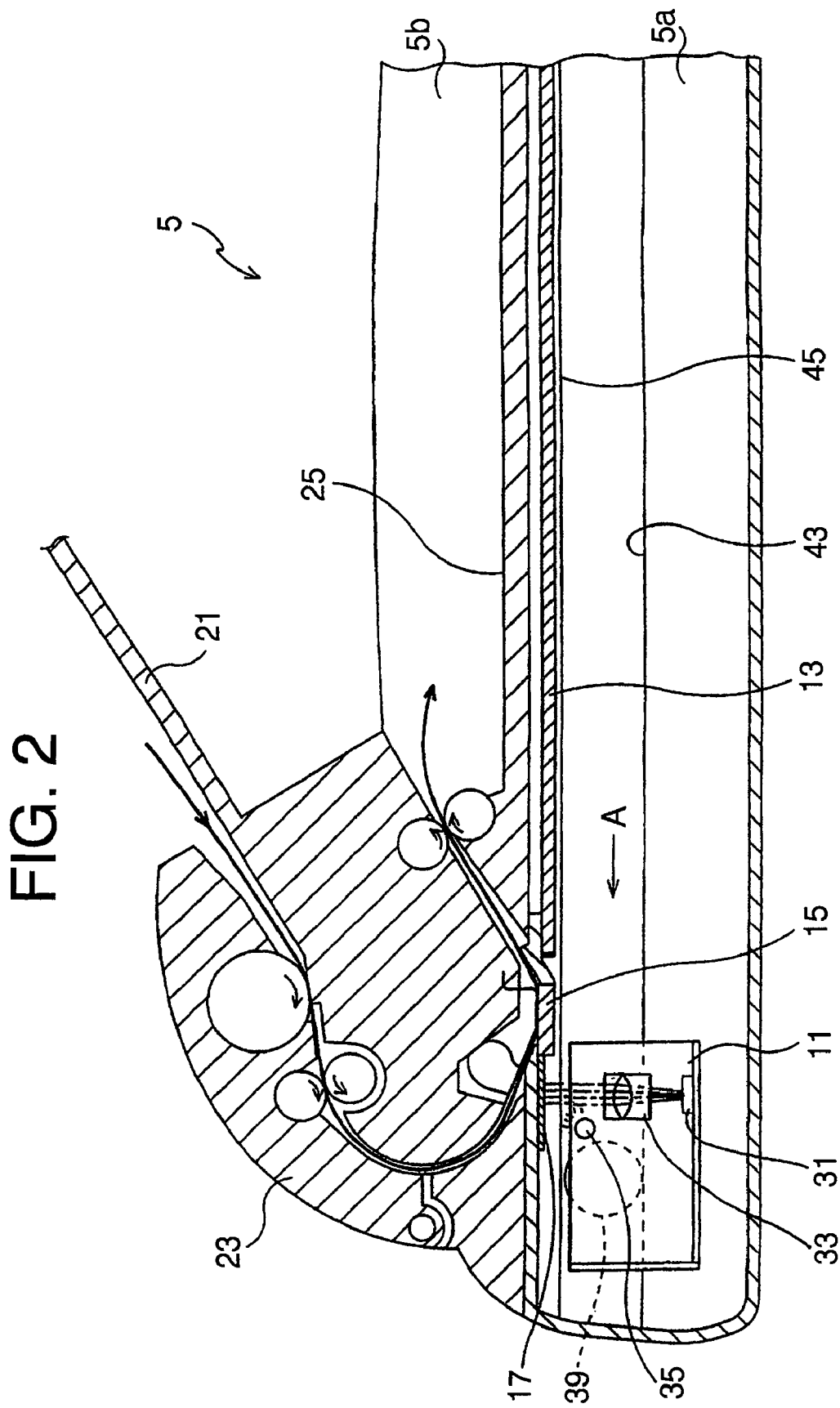
FIG. 2 is a cross-sectional view showing the configuration of an image scanning unit of the MFP.
Figure 3:
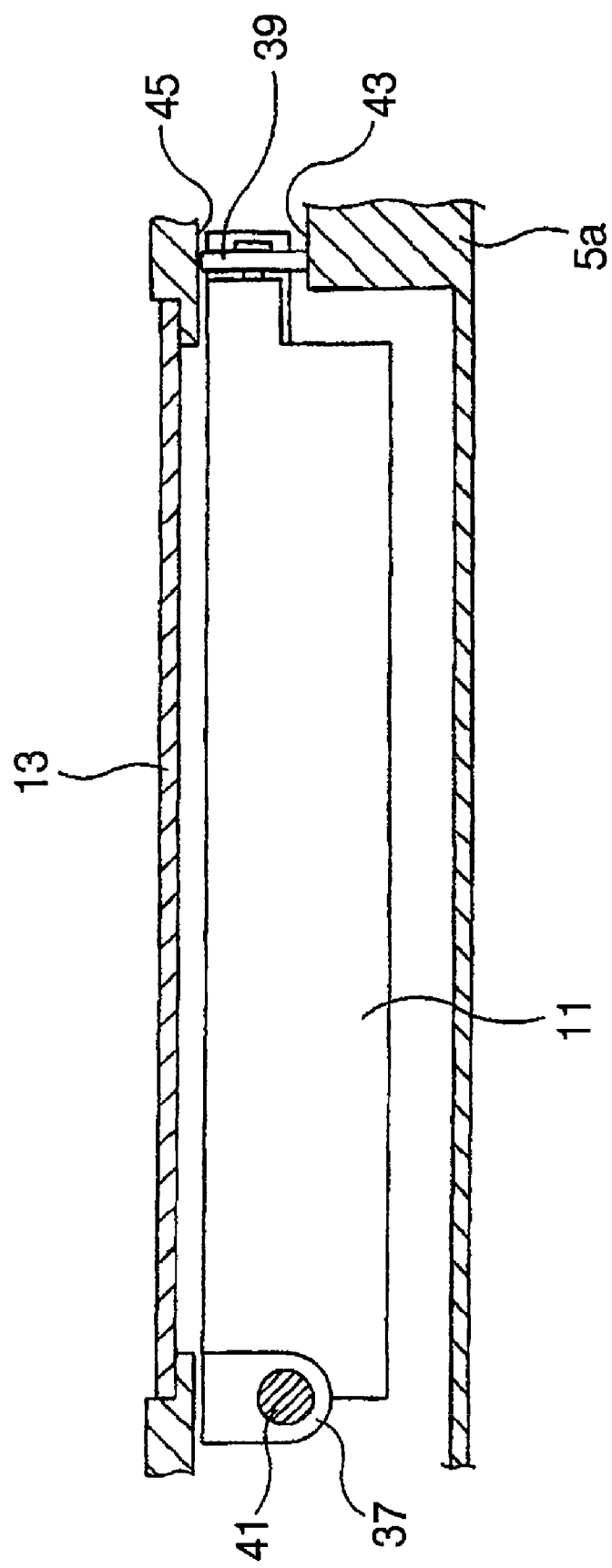
FIG. 3 is a cross-sectional view of a part of the image scanning unit around a scanning head viewed in the direction of arrow A in FIG. 2.

FIG. 1 is a perspective view showing the external appearance of an MFP (Multi-Function Peripheral) 1 as an image processing device in accordance with an embodiment of the present invention. The MFP 1 is a peripheral device having the so-called image scanner function, printer function, copy function and facsimile function. FIG. 2 is a cross-sectional view showing the configuration of an image scanning unit 5 of the MFP 1. FIG. 3 is a cross-sectional view of a part of the image scanning unit 5 around a scanning head 11 viewed in the direction of arrow A in FIG. 2.

As shown in FIG. 1, the MFP 1 has a clam shell-like opening/closing structure, in which an upper body 1b is attached to a lower body 1a to be openable and closeable. An image formation unit 3 (laser printer in this embodiment) is installed in the lower body 1a while the image scanning unit 5 is installed in the upper body 1b. An operation panel 7 is formed in a front part of the upper body 1b.

The image scanning unit 5 is of a type having both an FB (Flat Bed) mechanism (for scanning an image on a document placed on a flat bed) and an ADF (Automatic Document Feeder) mechanism (for scanning an image on a document while feeding the document to an image scanning position).

As shown in FIG. 2, the image scanning unit 5 also has a clam shell-like opening/closing structure, in which a cover part 5b is attached to a flat bed part 5a to be openable and closeable.

In the image scanning unit 5, the maximum document size allowing for image scanning is set at 8.5"×14" (legal size). Thus, the flat bed is configured so that a document of the legal size can be placed thereon and the ADF is configured to be capable of feeding a legal-size document in its lengthwise direction.

As shown in FIG. 2, the flat bed part 5a of the image scanning unit 5 is equipped with the scanning head 11, first platen glass 13, second platen glass 15, a whiteboard 17, etc. Meanwhile, the cover part 5b is equipped with a document feed tray 21, a document feeding unit 23, a document output tray 25, etc.

The scanning head 11 (so-called CIS (Contact Image Sensor)) includes an image sensor 31 having multiple line sensors for receiving light, an optical element 33 (lens), and a light source 35 for emitting light.

Thus, the scanning head 11 is configured to scan the image on the document with the image sensor 31 (one line in the main scanning direction at a time) by emitting light from the light source 35 onto the document existing at a scan target position and receiving reflected light from the document with the image sensor 31 via the optical element 33 (lens).

As shown in FIG. 3, the scanning head 11 has a bearing 37 at one end and a roller 39 at the other end. Inside the flat bed part 5a, a guide bar 41 (in parallel with the first platen glass 13, the second platen glass 15 and the whiteboard 17) is drawn through the bearing 37 while the roller 39 is placed on a guide surface 43, by which the scanning head 11 (laid between the guide bar 41 and the guide surface 43) is allowed to move to and fro along the guide bar 41 (in the auxiliary scanning direction).

As shown in FIG. 2, the top of the roller 39 protrudes upward relative to the top of the scanning head 11. A guide part 45 is placed to have a narrow gap (approximately 0.5 mm in this embodiment) between it and the roller 39. With such a configuration, even when the scanning head 11 receives force rotating it around the guide bar 41 (due to vibration during transportation of the MFP 1, for example), the roller 39 first makes contact with the guide part 45 to stop the rotation of the scanning head 11, by which the main body of the scanning head 11 is prevented from colliding against the first platen glass 13, the second platen glass 15 or the whiteboard 17.

The first platen glass 13 is platen glass that is used for the document image scanning on the FB (Flat Bed) side of the image scanning unit 5. For the document image scanning by use of the flat bed, the user places the document on the first platen glass 13, closes the cover part 5b to make it cover the document, and performs a prescribed operation (e.g. presses a scan start button) while pressing down the cover part 5b to make it press the document against the first platen glass 13. According to the user operation, the image scanning unit 5 scans the image on the document while moving the scanning head 11 in the auxiliary scanning direction (along the guide bar 41 and the first platen glass 13) by driving a stepping motor 27 (see FIG. 4) for the movement of the scanning head 11.

The second platen glass 15 is platen glass that is used for the document image scanning on the ADF side of the image scanning unit 5. For the document image scanning by use of the ADF, the user places the document on the document feed tray 21 and performs a prescribed operation (e.g. presses the scan start button). According to the user operation, the image scanning unit 5 makes the document feeding unit 23 feed the document from the document feed tray 21 toward the document output tray 25 while making the scanning head 11 (staying beneath the second platen glass 15) scan the image on the document being fed above the second platen glass 15 in the auxiliary scanning direction.

The whiteboard 17 is a white board-like member having an even color density distribution. White level correction data, which is necessary for converting actual measurement data (acquired by actually scanning the document) into ideal data, is obtained by use of image data acquired by scanning the whiteboard 17 (representing luminance of the whiteboard 17). Thereafter, a white level correction process (shading correction process) is executed using the white level correction data.

Incidentally, the image formation unit 3 installed in the lower body 1a of the MFP 1 (see FIG. 1) takes in a sheet-like print medium such as paper (hereinafter referred to simply as a "sheet") from a sheet feed tray 51 at the back of the MFP 1, forms (prints) an image on a print surface of the sheet, and ejects the printed sheet through a sheet ejection slot 53 at the front of the MFP 1. A drawable (pullout) sheet output tray 55, which is usually stored beneath the sheet ejection slot 53, can be pulled out as needed to receive the sheets ejected through the sheet ejection slot 53.

The operation panel 7 includes numeric keys to be pressed for inputting numbers, a cursor key to be pressed for specifying any of the four directions (upward, downward, rightward, leftward), buttons and switches to be operated for inputting various instructions, a liquid crystal panel for displaying necessary information (menu image, error message, etc), etc. By use of the buttons, switches, etc., the user can operate the MFP 1 in various ways, such as specifying an operation mode of the MFP 1, setting an operation mode (or calling up another menu screen) by selecting a menu item from a menu screen displayed on the liquid crystal panel, etc.

<2. Configuration of Control System>

Figure 4:
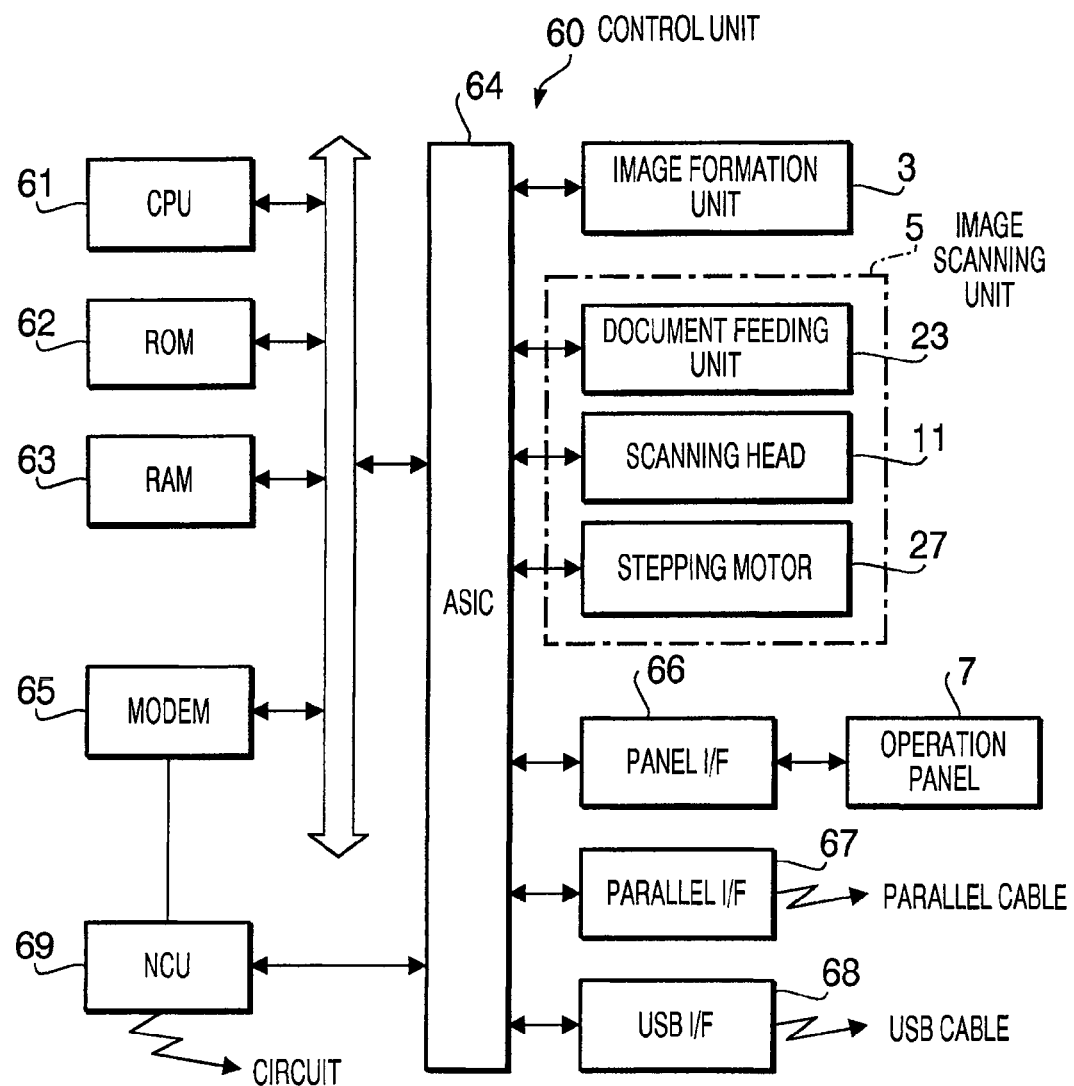
FIG. 4 is a block diagram showing the configuration of the control system of the MFP.

FIG. 4 is a block diagram showing the configuration of the control system of the MFP 1. As shown in FIG. 4, the MFP 1 is equipped with a control unit 60 which is mainly composed of a micro computer including a CPU (Central Processing Unit) 61, a ROM (Read Only Memory) 62, a RAM (Random Access Memory) 63, etc. A program for making the CPU 61 execute a process which will be described referring to FIGS. 11-13 has been stored in the ROM 62.

The control unit 60 further includes an ASIC (Application-Specific Integrated Circuit) 64 and a modem 65 which are connected to the micro computer (CPU 61, ROM 62, RAM 63, etc.) via a bus.

Connected to the ASIC 64 are the image formation unit 3, the image scanning unit 5 (including the aforementioned document feeding unit 23, scanning head 11 and stepping motor 27), a panel interface 66, a parallel interface 67, a USB interface 68 and an NCU (Network Control Unit) 69.

The panel interface 66 is an interface for inputting/outputting signals from/to the operation panel 7. The parallel interface 67 is an interface for inputting/outputting image information from/to an external PC (Personal Computer), etc. The USB interface 68 is an interface for inputting/outputting image information from/to an external device (PC, digital camera, etc.). The NCU 69 is a unit for transmitting/receiving information to/from an external facsimile machine via a public network (e.g. telephone circuit).

The ASIC 64 makes the MFP 1 function as a printer, an image scanner, a copier and a facsimile machine, by controlling the image formation unit 3, the image scanning unit 5 and the NCU 69 according to various control parameters which have been set in its internal registers by the CPU 61.

The ASIC 64 serves also as a relaying unit which outputs input data from the CPU 61 to the operation panel 7, external device, etc. via the interfaces 66-68 while supplying the CPU 61 with input data received via the interfaces 66-68.

The scanning head 11 is equipped with LEDs of three colors (red (R), green (G), blue (B)) as the light source 35. In the image scanning, the ASIC 64 generates image data corresponding to one line in the main scanning direction at a time based on reflected light of each color from the document (by successively lighting the LEDs and acquiring image data of each color from the image sensor 31 upon each lighting) and then generates color image data by combining the image data of the three colors.

<3. Settings of Image Scanning Operation>

The MFP 1 of this embodiment allows the user to make various settings regarding the image scanning operation (scanning of a document image with the image scanning unit 5). Specifically, the user can make settings regarding the scanning area, operation mode, image quality and output resolution through the operation panel 7 as the image scanning settings.

The setting of the scanning area is made by specifying the size of the document or by specifying a desired area in the document. When the document size is specified as the scanning area, the MFP 1 of this embodiment sets the scanning area as an area slightly smaller than the actual document size, by taking the top/bottom/right/left margins (or the top/bottom margins) of the document (3 mm wide, for example) into account.

The setting of the operation mode is made by selecting one from a copy mode, FAX mode and PC scan mode. Incidentally, the copy mode is an operation mode for making the image formation unit 3 print a scanned document image on a sheet. The FAX mode is an operation mode for transmitting/receiving FAX image data. The PC scan mode is an operation mode for storing a scanned document image in a PC (Personal Computer) as image data.

The setting of the image quality is made by selecting one from options like "automatic", "photo", "text", "1677 million colors", "monochrome" and "256 steps of gray".

The setting of the output resolution is made by selecting one from options like 600×600 dpi and 203.2×97.79 dpi (FAX standard).

<4. Outline of Image Processing>

The MFP 1 of this embodiment determines the contents of image processing to be executed to an input image, based on the image scanning settings (regarding the operation mode, image quality and output resolution) made by the user. Some types of image processing involve (cause) loss of pixels at an edge of the image of output image data (after undergoing the image processing) in comparison with input image data (before undergoing the image processing) due to the nature of each processing method. As such image processing, the MFP 1 of this embodiment is capable of executing a filtering process, a resolution conversion process (including interpolation), a ground color correction process and a color shift correction process.

Therefore, the MFP 1 of this embodiment prevents the output image from becoming smaller than the preset scanning area due to image processing, by previously extending the area of the input image (as the processing target) taking the amount of the pixel loss caused by the image processing into account. Here, each of the aforementioned types of image processing will be explained in detail below.

<4-1. Filtering Process>

The filtering process is a process for correcting the input image (enhancing correction, smoothing correction, both at the same time, etc.) using an image correction filter (hereinafter referred to simply as a "filter") in which rates of incorporation of values of surrounding pixels into the value of the pixel under consideration (that is, to what extent the value of each of the pixels surrounding the pixel under consideration should be incorporated into the value of the pixel under consideration) have been set. Specifically, when the input image data shown in FIG. 5A is corrected using a filter having the filter coefficients shown in FIG. 5B, the value of a pixel under consideration (having a value "$P_{22}$" (filled in with black in the input image data shown in FIG. 5A)) in the output image data is calculated according to the following equation (1):

$$p = \frac{\sum_{i=1}^{3}\sum_{j=1}^{3} p_{ij} \times m_{ij}}{\sum_{i=1}^{3}\sum_{j=1}^{3} m_{ij}} \quad (1)$$

Figures 5A, 5B, 5C, 5D:
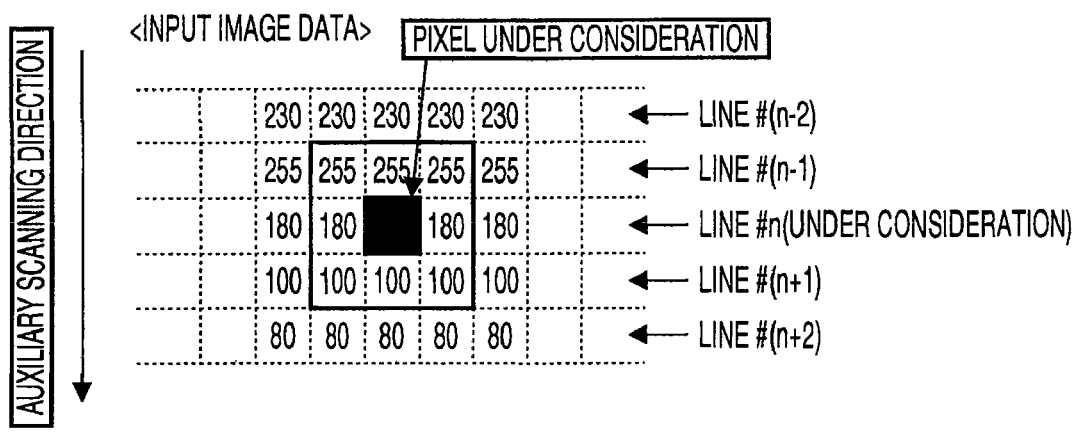
FIGS. 5A-5D are schematic diagrams for explaining a filtering process which is executed by the MFP.

For example, when the input image data shown in FIG. 5C is corrected using a 3×3 filter having the filter coefficients shown in FIG. 5D, the value of the pixel under consideration in the output image data is calculated as (1×255+2×255+1× 255+2×180+4×180+2×180+1×100+2×100+1×100)÷(1+2+ 1+2+4+2+1+2+1)=178.

As above, the degree of the correction of the input image is determined depending on the filter coefficients. In this embodiment, multiple types of filters for achieving desired correction are available. As for the filter size, in addition to the aforementioned 3×3 filters (having three lines (rows) and three columns, that is, including three (horizontal) lines arranged vertically×3 pixels arranged horizontally), 5×5 filters, 3×5 filters, 1×3 filters and 1×5 filters have been prepared.

Figure 6A:
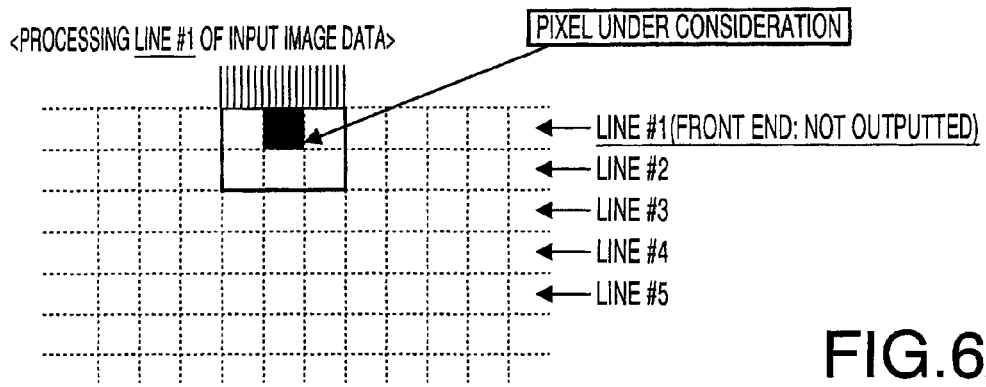
FIGS. 6A-6D are schematic diagrams for explaining loss of pixels caused by the filtering process.
Figure 6B:
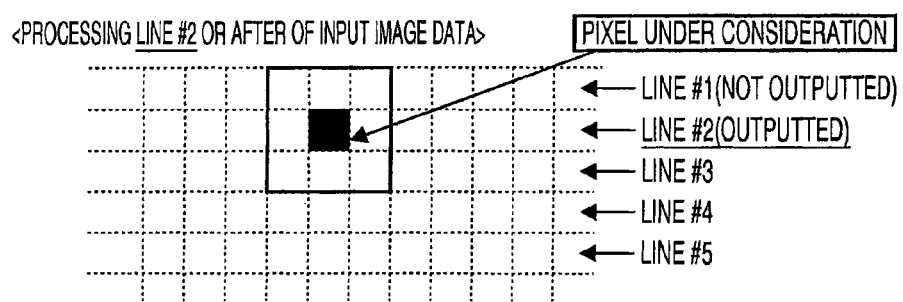
Figure 6C:
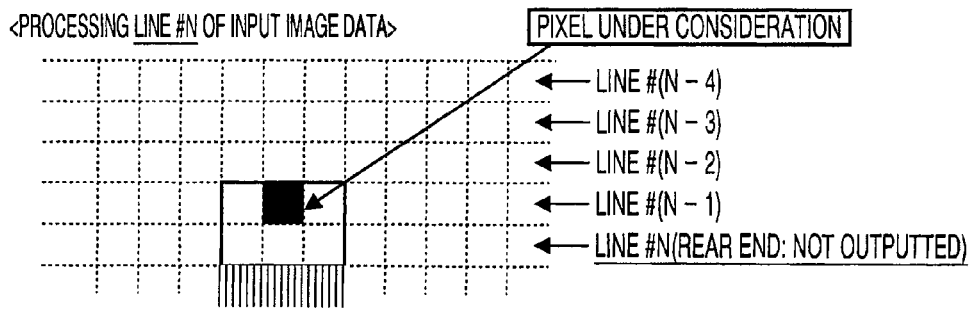

In such a filtering process, the correction can not be made to a pixel lacking part or all of the surrounding pixels to be used for the filtering, and thus the pixel value (after correction) is not outputted for such pixels. For example, when a 3×3 filter is used and a pixel in the first line of the input image data is under consideration as shown in FIG. 6A, the aforementioned calculation can not be executed for the pixel under consideration since it does not have part of the surrounding pixels (i.e. first line of the filter). Thus, pixels (pixel values obtained by the calculation) corresponding to the first line of the input image data are not outputted.

Subsequently, for pixels (other than the rightmost/leftmost pixels) in the second line of the input image data or after (each having the surrounding pixels), pixels (pixel values obtained by the calculation) are outputted.

However, as for the last line (N-th line) of the input image data, the calculation is impossible for each pixel under consideration since it does not have part of the surrounding pixels (i.e. third line of the filter) similarly to the pixels in the first line. Thus, pixels (pixel values obtained by the calculation) corresponding to the last line of the input image data are also not outputted.

As above, pixels in the first and last lines (lines first and last in regard to the auxiliary scanning direction) of the input image data are lost when the filtering process is executed to the input image data by use of a 3×3 filter.

Figure 6D:
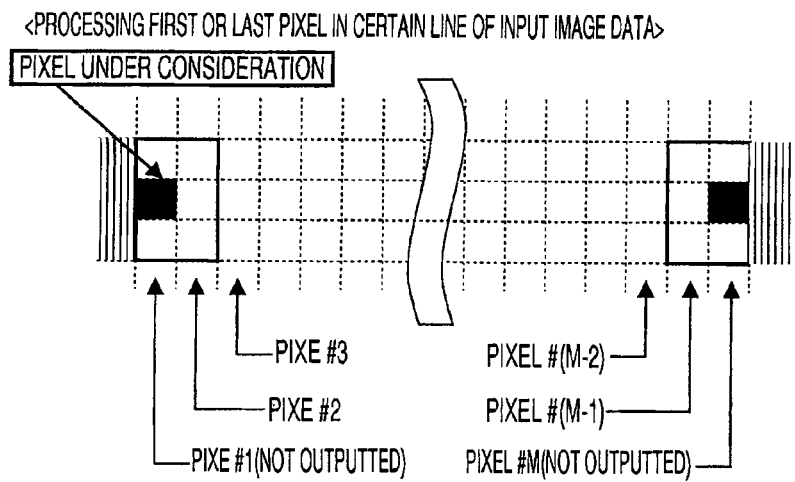

The same phenomenon occurs in regard to the main scanning direction. When a pixel in the first or last (M-th) column of the input image data (i.e. a pixel that is the first or last (M-th) in the main scanning direction) is under consideration as shown in FIG. 6D, the calculation is impossible for the considered pixel since it does not have part of the surrounding pixels (i.e. first or last column of the filter). Thus, the first and M-th pixels (i.e. pixels (pixel values obtained by the calculation) corresponding to the first and last columns of the input image data) are also not outputted.

Incidentally, when a 5×5 filter is used, two pixels (lines) are lost at each end of the input image data in the auxiliary scanning direction and two pixels (columns) are lost at each end of the input image data in the main scanning direction. When a 3×5 filter is used, a pixel (line) is lost at each end in the auxiliary scanning direction and two pixels (columns) are lost at each end in the main scanning direction. When a 1×3 filter is used, no pixel (line) is lost at each end in the auxiliary scanning direction and a pixel (column) are lost at each end in the main scanning direction. When a 1×5 filter is used, no pixel (line) is lost at each end in the auxiliary scanning direction and two pixels (columns) are lost at each end in the main scanning direction.

Therefore, the MFP 1 of this embodiment is configured to prevent the loss of pixels in the original area of the input image data, by previously extending the area of the input image data by extending the scanning area of the image (document) depending on the filter size. For example, when a 3×3 filter is used, the image scanning area is extended by one pixel (line) at each end of the image scanning area in the auxiliary scanning direction and by one pixel (column) at each end of the image scanning area in the main scanning direction. When a 3×5 filter is used, the image scanning area is extended by one pixel (line) at each end in the auxiliary scanning direction and by two pixels (columns) at each end in the main scanning direction.

<4-2. Resolution Conversion Process Including Interpolation>

The resolution conversion process including interpolation is a process in which interpolation (linear interpolation) is executed to the input image data during the resolution conversion of the input image.

For example, in the resolution conversion process shown in FIG. 7 for tripling the number of pixels in the main scanning direction, the pixel values of the first, second, . . . and M-th pixels of the input image data are directly used as the first, fourth, . . . and (3M−2)-th pixels of the output image data and the other pixels (pixel values) of the output image data are obtained by means of linear interpolation as below. Incidentally, the notation "input/output pixel #m" in the following equations denotes the m-th pixel in the main scanning direction in the input/output image data.

output pixel #1=input pixel #1 output pixel #2=(200×input pixel #1+100×input pixel #2)÷300 output pixel #3=(100×input pixel #1+200×input pixel #2)÷300 output pixel #4=input pixel #2 output pixel #(3M−2)=input pixel #M

In such interpolation, the number of pixels outputted after (i.e. as the result of) the linear interpolation is 3M−2 when the number of input pixels is M. Since pixels #(3M−1) and #3M (i.e. values of the (3M−1)-th and 3M-th pixels in the main scanning direction) in the output image data can not be calculated, the last two pixels in the main scanning direction are lost.

Therefore, when such interpolation is executed, the MFP 1 of this embodiment previously extends the area of the input image data by extending the image scanning area by one pixel in the main scanning direction (i.e. by continuing the scanning up to the (M+1)-th pixel in the main scanning direction). By the extension of the area of the input image data, pixels #(3M−1) and #3M (in the main scanning direction) in the output image data can also be calculated and the loss of the last two pixels in the main scanning direction can be prevented as below.

output pixel #(3M − 1) =
    (200 × input pixel #M + 100 × input pixel #(M + 1)) ÷ 300 output pixel #3M =
    (100 × input pixel #M + 200 × input pixel #(M + 1)) ÷ 300

Figure 8:
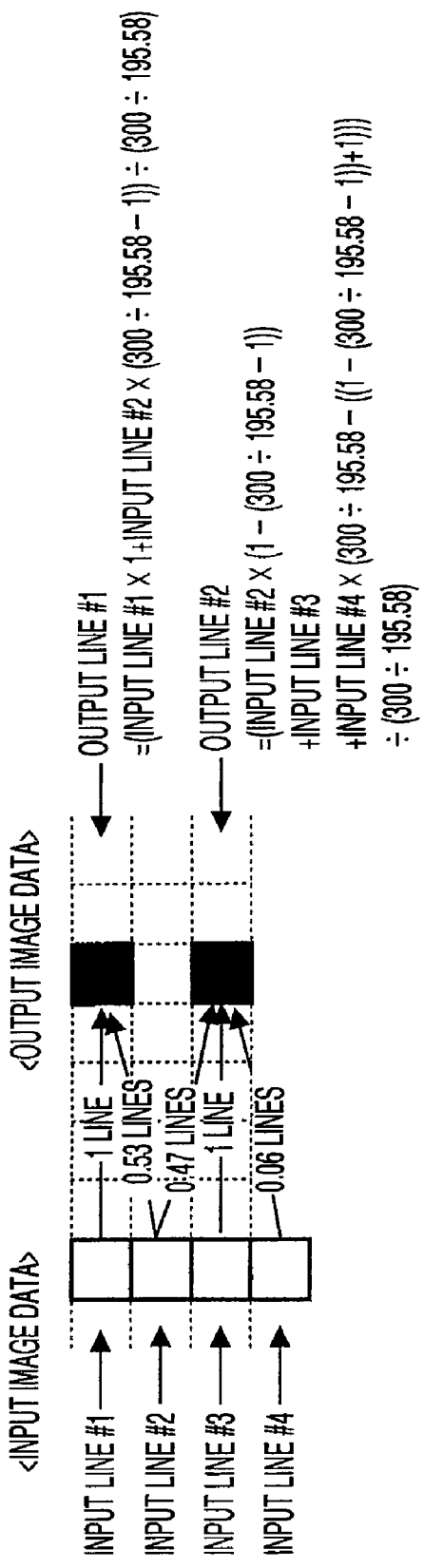
FIG. 8 is a schematic diagram for explaining a resolution conversion process (resolution conversion in the auxiliary scanning direction) which is executed by the MFP.

Meanwhile, in the resolution conversion process shown in FIG. 8 in which the resolution in the auxiliary scanning direction is converted from 300 dpi to 195.58 dpi (FAX fine), each pixel value in the first and second lines of the output image data are obtained by linear interpolation based on pixel values in the input image data as below. Incidentally, the notation "input/output line #n" in the following equations denotes the value of each pixel in the n-th line (line that is the n-th in regard to the auxiliary scanning direction) in the input/output image data.

output line #1 =
    (input line #1 × 1 + input line #2 × (300 ÷ 195.58 − 1)) ÷ (300 ÷ 195.58)

output line #2 =
    (input line #2 × (1 − (300 ÷ 195.58 − 1)) + input line #3 + input line #4 ×
    (300 ÷ 195.58 − ((1 − (300 ÷ 195.58 − 1)) + 1))) ÷ (300 ÷ 195.58)

As above, in order to output the two lines after the linear interpolation in the auxiliary scanning direction, the input fourth line (input line #4) becomes necessary in addition to the input first through third lines (corresponding to "3" which is obtained by rounding down 2×(300÷195.58)=3.06 . . . ).

Therefore, when such interpolation is executed, the MFP 1 of this embodiment previously extends the area of the input image data by extending the image scanning area by one pixel in the auxiliary scanning direction (i.e. by continuing the scanning up to an extra line next to the last line). By the extension of the area of the input image data, the loss of pixels can be prevented.

<4-3. Ground Color Correction Process>

The ground color correction process is a process for correcting scanned color based on the ground color of the document which is detected in a part (area) of the document image. Thus, in cases where the document (e.g. newspaper) has a certain ground color, the color correction is executed to the whole of the input image so that the ground color will be outputted as white. For example, when the ground color of the document is "200" as shown in FIG. 9B, the ground color correction is executed so that each area (in the input image) having higher luminance than the ground color "200" will be outputted as white (=255), by multiplying each input value by 255/200.

Figure 9A:
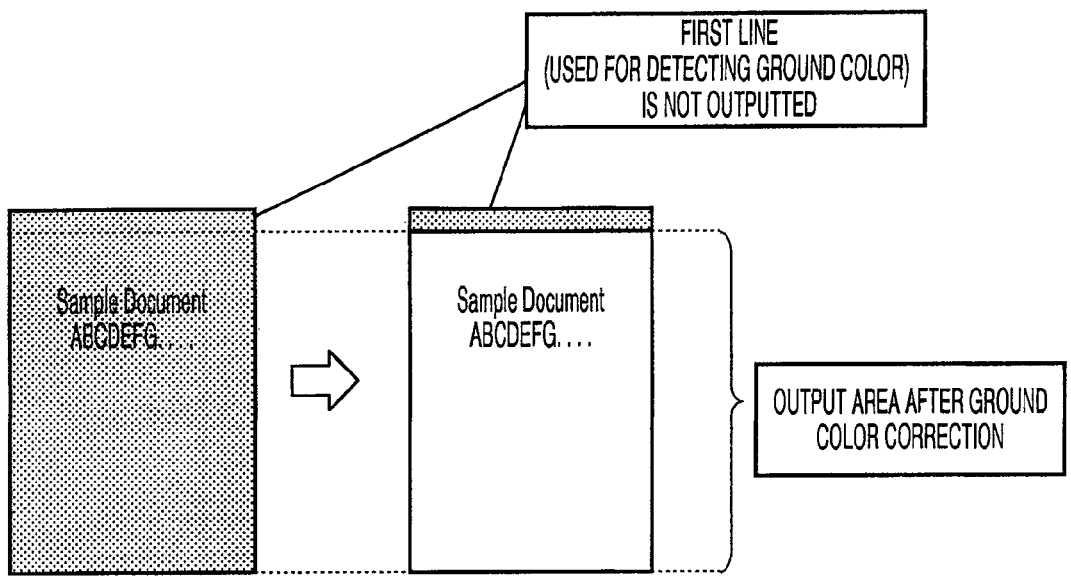
FIGS. 9A and 9B are schematic diagrams for explaining a ground color correction process which is executed by the MFP.
Figure 9B:
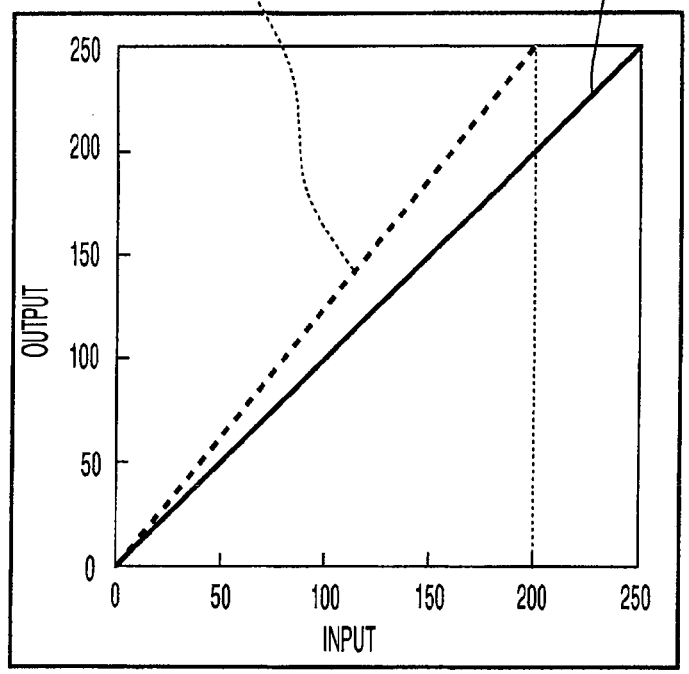

As shown in FIG. 9A, the MFP 1 of this embodiment uses the first line (i.e. line that is the first in regard to the auxiliary scanning direction) of the input image data as the area for the detection of the ground color of the document. The MFP 1 determines the ground color as the average luminance of a prescribed number of pixels (e.g. 10 pixels) having high luminance in the area, and then executes the ground color correction to the subsequent area (from the second line) based on the determined ground color. In such a ground color correction process, the first line in regard to the auxiliary scanning direction is lost (i.e. not outputted).

Therefore, when such a ground color correction process is executed, the MFP 1 of this embodiment previously extends the area of the input image data by extending the image scanning area by one line (i.e. by scanning one extra line at the front end in the auxiliary scanning direction), by which the loss of pixels can be prevented.

<4-4. Color Shift Correction Process>

Figure 10:
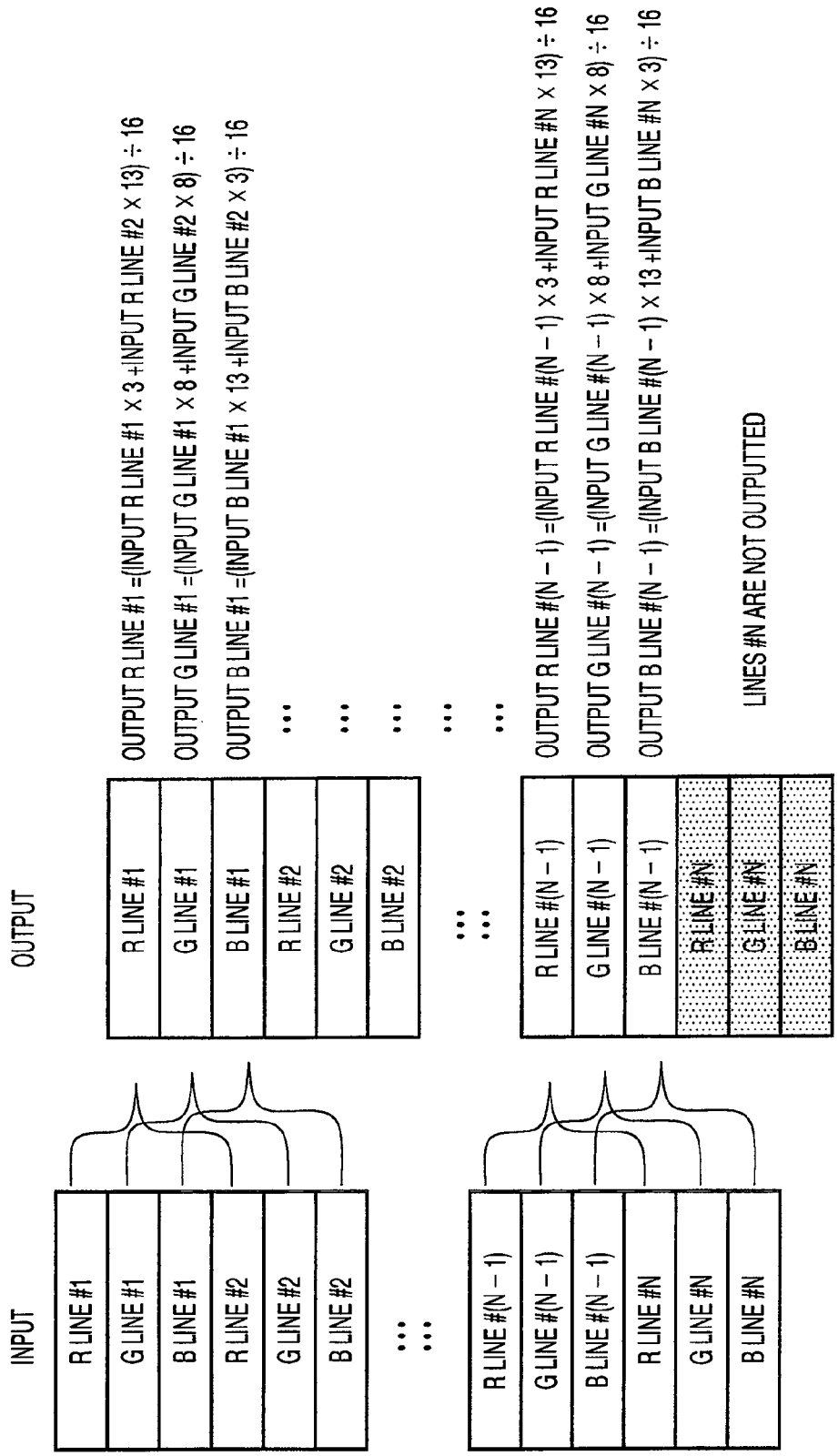
FIG. 10 is a schematic diagram for explaining a color shift correction process which is executed by the MFP.

The color shift correction process is a process for correcting a shift in the scanning position regarding each color. In the MFP 1 of this embodiment, the image scanning unit 5 is a CIS (Contact Image Sensor) scanner which executes the document image scanning (in units of lines) in regard to each color (R, G, B) by switching the color of the light (emitted onto the document) successively to R, G and B while changing the relative position of the scanning head 11 with respect to the document in the auxiliary scanning direction. Therefore, even though the first line of R (red input image data), the first line of G (green input image data) and the first line of B (blue input image data) are all the same first lines, a shift in the scanning position in the auxiliary scanning direction occurs among them. In order to correct (compensate for) the shift, the MFP 1 of this embodiment executes the color shift correction process (interpolation) as below (see FIG. 10). In the following equations, the notation "input/output R line #n" denotes the value of each pixel in the n-th line in the red input/output image data, "input/output G line #n" denotes the value of each pixel in the n-th line in the green input/output image data, and "input/output B line #n" denotes the value of each pixel in the n-th line in the blue input/output image data.

output R line #1=(input R line #1×3+input R line #2×13)÷16 output G line #1=(input G line #1×8+input G line #2×8)÷16 output B line #1=(input B line #1×13+input B line #2×3)÷16

. . .

output R line #(N−1)=(input R line #(N−1)×3+input R line #N×13)÷16 output G line #(N−1)=(input G line #(N−1)×8+input G line #N×8)÷16 output B line #(N−1)=(input B line #(N−1)×13+input B line #N×3)÷16

In such a color shift correction process, output R line #N, output G line #N and output B line #N (i.e. values of pixels in the N-th line in the red input image data, green input image data and blue input image data) can not be calculated, and thus the last line in regard to the auxiliary scanning direction (N-th line) is lost.

Therefore, when the color shift correction process is executed, the MFP 1 of this embodiment previously extends the area of the input image data by extending the image scanning area by one pixel in the auxiliary scanning direction (i.e. by continuing the scanning up to an extra line next to the last line, that is, up to the (N+1)-th line. By the extension of the area of the input image data, output R line #N, output G line #N and output B line #N (i.e. values of pixels in the N-th line in the red input image data, green input image data and blue input image data) can also be calculated and the loss of pixels can be prevented.

<5. Process Executed by CPU>

In the following, a process which is executed by the CPU 61 of the control unit 60 of the MFP 1 for implementing the aforementioned processes will be described with reference to a flow chart of FIG. 11. The process shown in FIG. 11 is started by the CPU 61 when a scan request is received by the MFP 1 via the panel interface 66, the parallel interface 67 or the USB interface 68.

Figure 11:
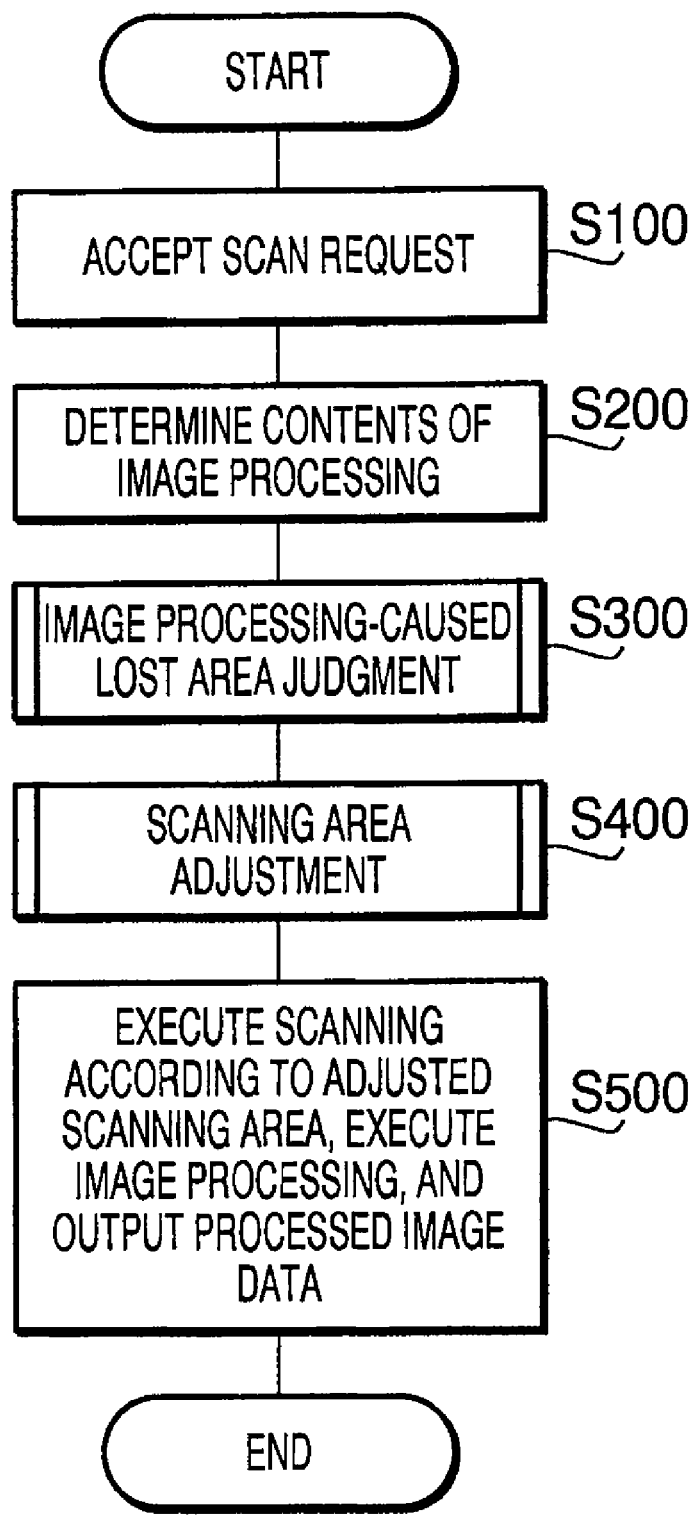
FIG. 11 is a flow chart showing a process which is executed by a CPU of a control unit of the MFP.

At the start of the process of FIG. 11, the CPU 61 accepts the received scan request which includes information on the image scanning settings which have been made by the user (S100). Incidentally, the scan request is received by the MFP 1 when an operation for requesting the MFP 1 to start the image scanning operation is performed by the user on the MFP 1 or on an external PC connected to the MFP 1.

In the next step S200, the CPU 61 determines the contents of the image processing to be executed to the scanned image based on the image scanning settings (regarding the operation mode, image quality and output resolution) included in the scan request accepted in S100. Specifically, the CPU 61 determines whether the filtering process should be executed or not (and the size of the filter (filter window) when the filtering process should be executed), whether the resolution conversion in the main/auxiliary scanning direction should be executed or not (and whether the interpolation should be further executed or not when the resolution conversion should be executed), whether the ground color correction should be executed or not, whether the color shift correction should be executed or not, input resolution, etc.

As for the filtering process, for example, a filter having a larger number of lines and pixels (i.e. filter capable of expressing image quality with higher fidelity) is used when the image is scanned with higher image quality. Incidentally, other settings (color/monochrome, photo/text, etc.) may also be taken into account.

For example, the numbers of lines and pixels of the filter when the MFP 1 is in the PC scan mode may be set larger than those when the MFP 1 is in the copy mode or the FAX mode since required scanning speed is lower in the PC scan mode compared to the copy mode and the FAX mode.

Further, the CPU 61 may determine to execute the ground color correction in cases of monochrome copy and monochrome FAX.

Incidentally, the CPU 61 in S200 does not necessarily have to automatically determine all the contents of the image processing (to be executed to the scanned image) based on the image scanning settings included in the scan request; the CPU 61 may also determine part or all of the contents of the image processing according to instructions from the user.

Figure 12:
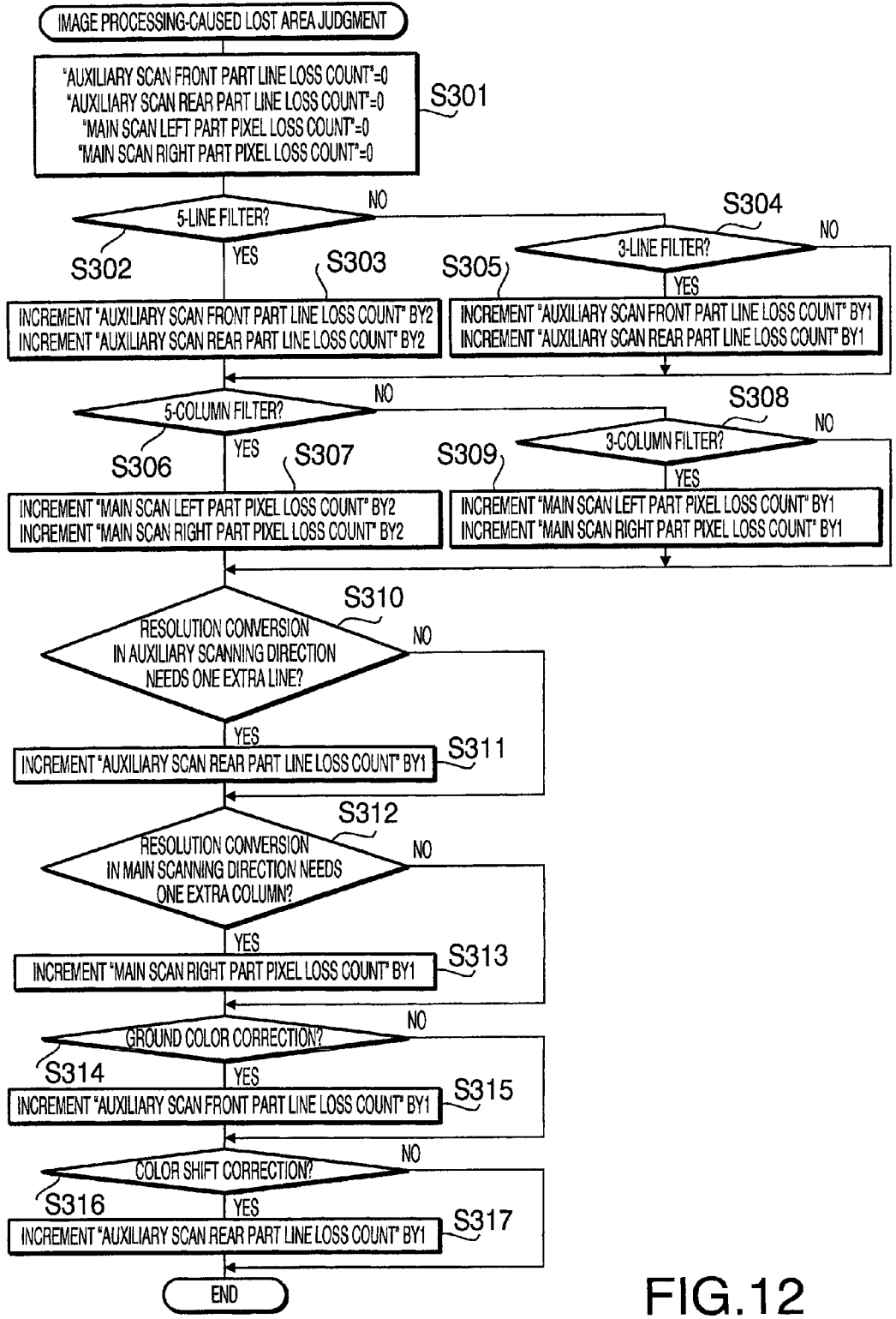
FIG. 12 is a flow chart showing details of image processing-caused lost area judgment (S300) in the process of FIG. 11.

In the next step S300, the CPU 61 makes a lost area judgment in order to judge the amount of the pixel loss (lost area) caused by the image processing determined in S200. The details of the image processing-caused lost area judgment will be described later (FIG. 12).

Figure 13:
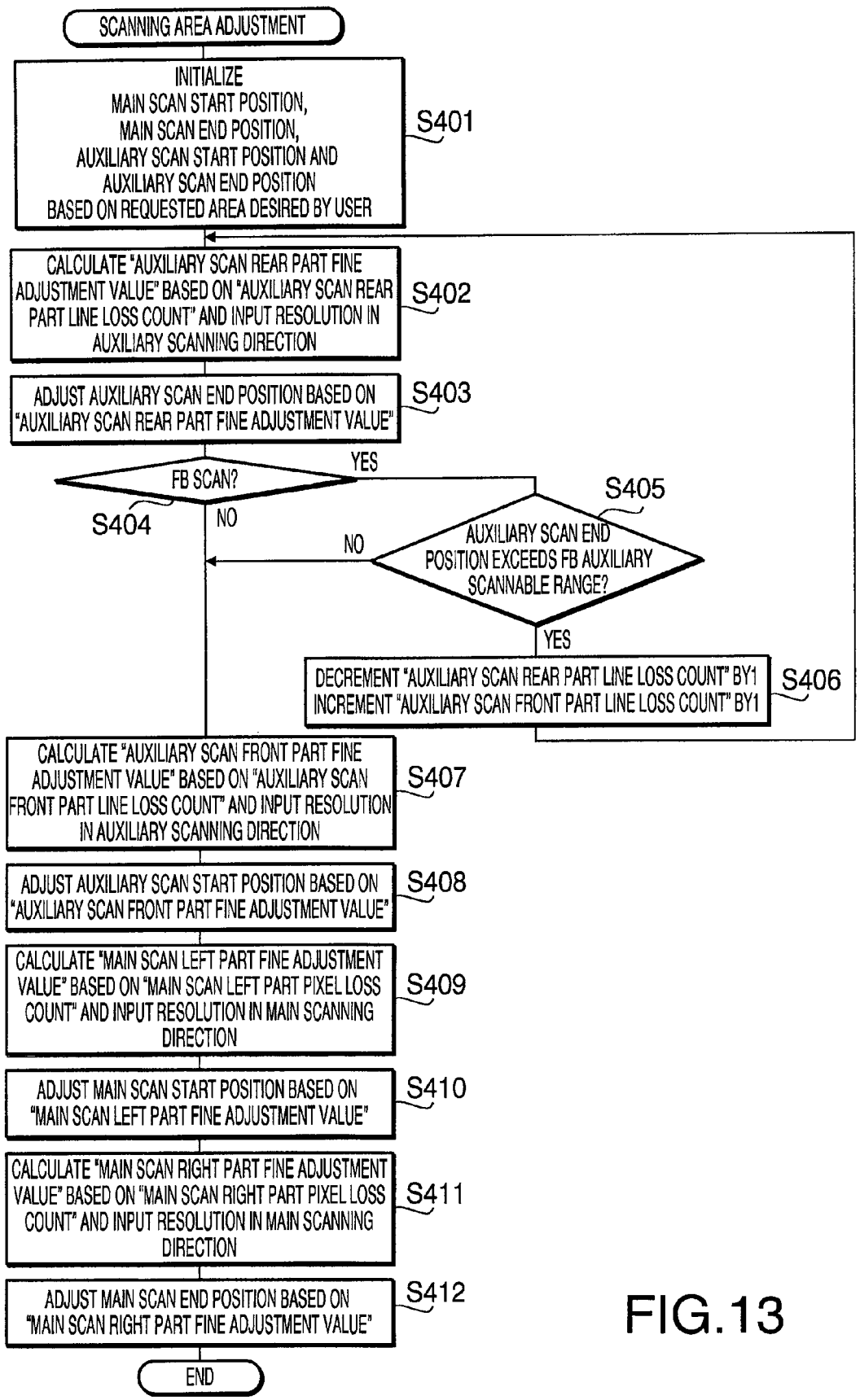
FIG. 13 is a flow chart showing details of scanning area adjustment (S400) in the process of FIG. 11.

In the next step S400, the CPU 61 performs a scanning area adjustment so as to adjust (extend) the scanning area depending on the amount of pixel loss judged in S300. The details of the scanning area adjustment will be described later (FIG. 13).

In the next step S500, the CPU 61 performs the image scanning operation according to the scanning area adjusted in S400, executes the image processing determined in S200 to image data obtained by the image scanning operation, and outputs the processed image data. Thereafter, the process of FIG. 11 is ended.

Next, the details of the aforementioned image processing-caused lost area judgment (S300 in FIG. 11) will be described referring to a flow chart of FIG. 12.

In the first step S301, the CPU 61 initializes an "auxiliary scan front part line loss count", an "auxiliary scan rear part line loss count", a "main scan left part pixel loss count", and a "main scan right part pixel loss count" to 0. Here, the "auxiliary scan front part line loss count" is a variable which is used for counting the number of lines that are lost in the front part of the document in the auxiliary scanning direction due to the image processing, and the "auxiliary scan rear part line loss count" is a variable which is used for counting the number of lines that are lost in the rear part of the document in the auxiliary scanning direction due to the image processing. Similarly, the "main scan left part pixel loss count" is a variable which is used for counting the number of pixels (columns) that are lost in the left part of the document in the main scanning direction due to the image processing, and the "main scan right part pixel loss count" is a variable which is used for counting the number of pixels (columns) that are lost in the right part of the document in the main scanning direction due to the image processing.

In the next step S302, the CPU 61 judges whether a filtering process using a filter having five lines (5×5 filter in this embodiment) should be executed or not.

When affirmative in S302 (S302: YES), the CPU 61 increments the "auxiliary scan front part line loss count" and the "auxiliary scan rear part line loss count" by 2 (S303) and thereafter advances to step S306.

On the other hand, when negative in S302 (S302: NO), the CPU 61 judges whether a filtering process using a filter having three lines (3×3 filter or 3×5 filter in this embodiment) should be executed or not (S304).

When affirmative in S304 (S304: YES), the CPU 61 increments the "auxiliary scan front part line loss count" and the "auxiliary scan rear part line loss count" by 1 (S305) and thereafter advances to the step S306.

On the other hand, when negative in S304 (in this embodiment, when a filtering process using a filter having one line is executed or when no filtering process is executed) (S304: NO), the CPU 61 directly advances to the step S306.

In the step S306, the CPU 61 judges whether a filtering process using a filter having five columns (i.e. filter whose number of pixels in each line is five, that is, 5×5 filter, 3×5 filter or 1×5 filter in this embodiment) should be executed or not.

When affirmative in S306 (S306: YES), the CPU 61 increments the "main scan left part pixel loss count" and the "main scan right part pixel loss count" by 2 (S307) and thereafter advances to step S310.

On the other hand, when negative in S306 (S306: NO), the CPU 61 judges whether a filtering process using a filter having three columns (i.e. filter whose number of pixels in each line is three, that is, 3×3 filter or 1×3 filter in this embodiment) should be executed or not (S308).

When affirmative in S308 (S308: YES), the CPU 61 increments the "main scan left part pixel loss count" and the "main scan right part pixel loss count" by 1 (S309) and thereafter advances to the step S310.

On the other hand, when negative in S308 (in this embodiment, when no filtering process is executed) (S308: NO), the CPU 61 directly advances to the step S310.

In the step S310, the CPU 61 judges whether or not it is necessary to scan one extra line due to execution of the resolution conversion process in the auxiliary scanning direction.

When affirmative in S310 (S310: YES), the CPU 61 increments the "auxiliary scan rear part line loss count" by 1 (S311) and thereafter advances to the step S312.

On the other hand, when negative in S310 (S310: NO), the CPU 61 directly advances to the step S312.

In the step S312, the CPU 61 judges whether or not it is necessary to scan one extra column (i.e. one extra pixel in the main scanning direction) due to execution of the resolution conversion process in the main scanning direction.

When affirmative in S312 (S312: YES), the CPU 61 increments the "main scan right part pixel loss count" by 1 (S313) and thereafter advances to step S314.

On the other hand, when negative in S312 (S312: NO), the CPU 61 directly advances to the step S314.

In the step S314, the CPU 61 judges whether the ground color correction should be executed or not.

When affirmative in S314 (S314: YES), the CPU 61 increments the "auxiliary scan front part line loss count" by 1 (S315) and thereafter advances to step S316.

On the other hand, when negative in S314 (S314: NO), the CPU 61 directly advances to the step S316.

In the step S316, the CPU 61 judges whether the color shift correction should be executed or not.

When affirmative in S316 (S316: YES), the CPU 61 increments the "auxiliary scan rear part line loss count" by 1 (S317) and ends the process of FIG. 12 (image processing-caused lost area judgment).

On the other hand, when negative in S316 (S316: NO), the CPU 61 directly ends the process.

Next, the details of the aforementioned scanning area adjustment (S400 in FIG. 11) will be described referring to a flow chart of FIG. 13.

In the first step S401, the CPU 61 initializes a main scan start position, a main scan end position, an auxiliary scan start position and an auxiliary scan end position based on a requested area desired by the user (i.e. scanning area set by the user). In other words, the CPU 61 sets the variables (main scan start position, main scan end position, auxiliary scan start position, auxiliary scan end position) at values corresponding to the scanning area set by the user.

In the next step S402, the CPU 61 calculates an "auxiliary scan rear part fine adjustment value" based on the "auxiliary scan rear part line loss count" and the input resolution in the auxiliary scanning direction as follows:

$$\text{auxiliary scan rear part fine adjustment value} =$$
$$(25.4 \text{ mm} \div \text{input resolution in auxiliary scanning direction}) \times$$
$$\text{auxiliary scan rear part line loss count}$$

In the next step S403, the CPU 61 adjusts the auxiliary scan end position based on the "auxiliary scan rear part fine adjustment value" calculated in S402 as follows:

$$\text{auxiliary scan end position} = \text{initial value of auxiliary scan end position} +$$
$$\text{auxiliary scan rear part fine adjustment value}$$

In the next step S404, the CPU 61 judges whether or not the FB (Flat Bed) is used for the image scanning operation.

When affirmative in S404 (S404: YES), the CPU 61 judges whether the auxiliary scan end position adjusted in S403 exceeds an FB auxiliary scannable range or not (S405). The FB auxiliary scannable range means the movable range of the scanning head 11 in the auxiliary scanning direction.

When affirmative in S405 (S405: YES), the CPU 61 decrements the "auxiliary scan rear part line loss count" by 1 while incrementing the "auxiliary scan front part line loss count" by 1 (S406) and thereafter returns to S402. In other words, when the movement of the scanning head 11 in the auxiliary scanning direction exceeds the movable range due to the extension (adjustment) of the auxiliary scan end position, the extension (adjustment) is reduced by transferring a line in the rear part in the auxiliary scanning direction to the front part in the auxiliary scanning direction. By the repetition of the above loop (S402-S406), lines exceeding the FB auxiliary scannable range are transferred from the rear part to the front part in the auxiliary scanning direction.

On the other hand, when negative in S404 or S405, that is, when the image scanning operation does not use the FB (Flat Bed) (S404: NO) or when the adjusted auxiliary scan end position does not exceed the FB auxiliary scannable range (S405: NO), the CPU 61 advances to S407 and calculates an "auxiliary scan front part fine adjustment value" based on the "auxiliary scan front part line loss count" and the input resolution in the auxiliary scanning direction as follows:

$$\text{auxiliary scan front part fine adjustment value} =$$
$$(25.4 \text{ mm} \div \text{input resolution in auxiliary scanning direction}) \times$$
$$\text{auxiliary scan front part line loss count}$$

In the next step S408, the CPU 61 adjusts the auxiliary scan start position based on the "auxiliary scan front part fine adjustment value" calculated in S407 as follows:

$$\text{auxiliary scan start position} =$$
$$\text{initial value of auxiliary scan start position} -$$
$$\text{auxiliary scan front part fine adjustment value}$$

In the next step S409, the CPU 61 calculates a "main scan left part fine adjustment value" based on the "main scan left part pixel loss count" and the input resolution in the main scanning direction as follows:

$$\text{main scan left part fine adjustment value} =$$
$$(25.4 \text{ mm} \div \text{input resolution in main scanning direction}) \times$$
$$\text{main scan left part pixel loss count}$$

In the next step S410, the CPU 61 adjusts the main scan start position based on the "main scan left part fine adjustment value" calculated in S409 as follows:

$$\text{main scan start position} = \text{initial value of main scan start position} -$$
$$\text{main scan left part fine adjustment value}$$

In the next step S411, the CPU 61 calculates a "main scan right part fine adjustment value" based on the "main scan right part pixel loss count" and the input resolution in the main scanning direction as follows:

$$\text{main scan right part fine adjustment value} =$$
$$(25.4\,\text{mm} \div \text{input resolution in main scanning direction}) \times$$
$$\text{main scan right part pixel loss count}$$

In the next step S412, the CPU 61 adjusts the main scan end position based on the "main scan right part fine adjustment value" calculated in S411 as follows:

$$\text{main scan end position} = \text{initial value of main scan end position} +$$
$$\text{main scan right part fine adjustment value}$$

Thereafter, the CPU 61 ends the process of FIG. 13 (scanning area adjustment).

<6. Effects>

As described above, the MFP 1 of this embodiment accepts the scan request including information on the image scanning settings made by the user (S100) and determines the contents of the image processing (to be executed to the scanned image) based on the image scanning settings included in the scan request (S200). The MFP 1 extends (adjusts) the area of the image as the processing target taking the amount of pixel loss to be caused by the image processing determined in S200 into account (S300, S400) and executes the image processing to the image whose area has been extended (S500), by which the decrease in the area of the image due to the image processing can be prevented.

Figure 14:
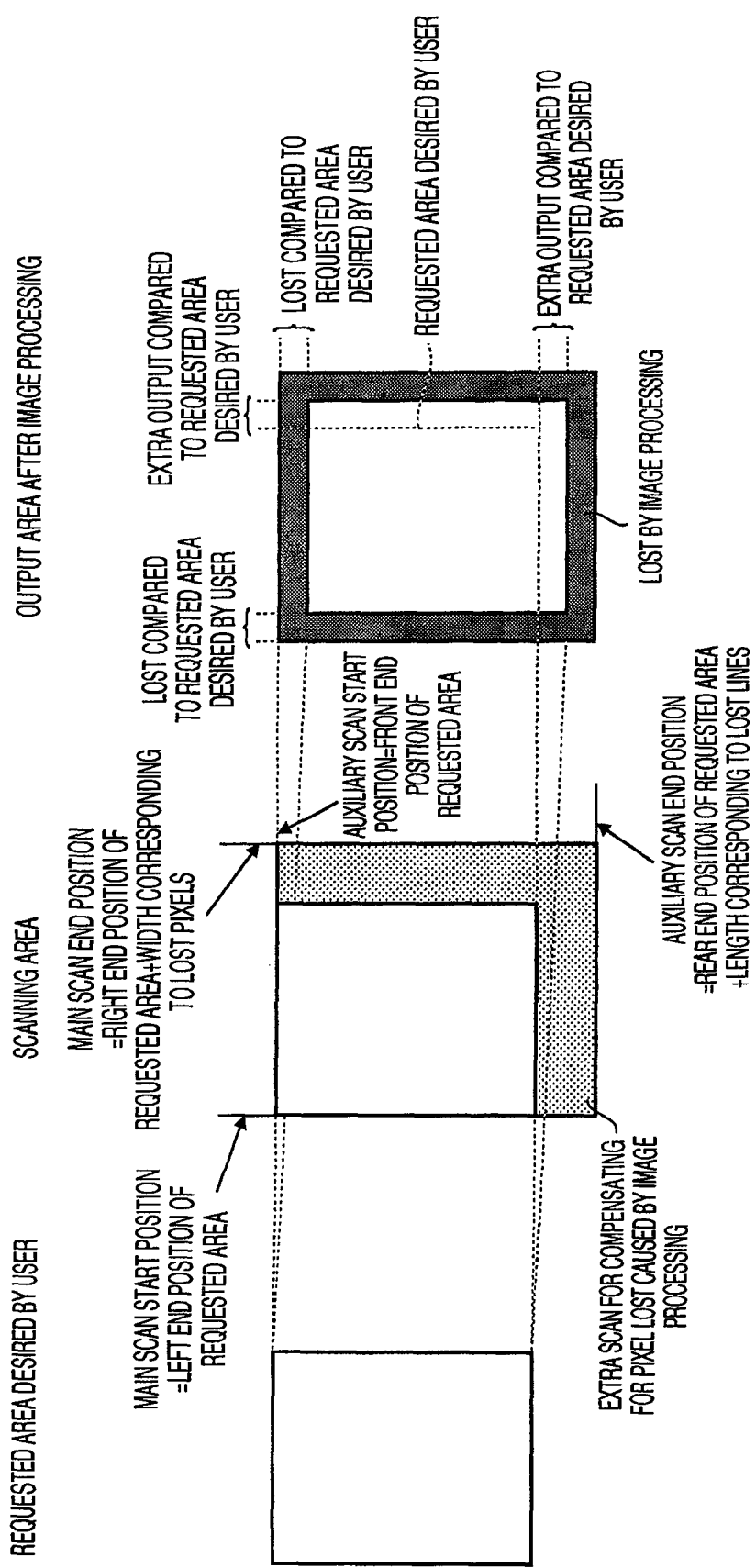
FIG. 14 is a schematic diagram for explaining a case where an image scanning area is extended to one side in the main scanning direction and to one side in the auxiliary scanning direction.

Especially, the MFP 1 of this embodiment extends the area of the input image (processing target) in appropriate directions and to an appropriate extent (i.e. by an appropriate number of pixels) required for the prevention of the loss of pixels in the scanned image caused by the image processing. For example, in order to prevent (compensate for) the pixel loss caused by the filtering process, it is of course possible to extend the scanning area as shown in FIG. 14, that is, horizontally extend the scanning area (not leftward but) exclusively rightward by a width corresponding to the number of pixels lost in a line in the main scanning direction due to the filtering process (i.e. the number of pixels (columns) of the filer−1) while vertically extending the scanning area (not frontward but) exclusively rearward by a length corresponding to the number of lines lost due to the filtering process (i.e. the number of lines of the filer−1). However, such a method results in a shift of the output area (after the filtering process) from the scanning area (requested area) desired by the user even though the decrease in the area of the output image due to the image processing (filtering process) can be prevented.

On the other hand, in this embodiment, the scanning area is horizontally extended leftward and rightward by a width corresponding to the number of pixels lost in the left part in the main scanning direction and by a width corresponding to the number of pixels lost in the right part in the main scanning direction, respectively, while vertically extending the scanning area frontward and rearward by a length corresponding to the number of lines lost in the front part in the auxiliary scanning direction and by a length corresponding to the number of lines lost in the rear part in the auxiliary scanning direction, respectively. In other words, the scanning area is extended in appropriate directions and by proper amount (widths/lengths) corresponding to the number of lines of the filter on each side (front side, rear side) of the considered pixel (i.e. pixel under consideration) in the auxiliary scanning direction and the number of pixels (columns) of the filter on each side (left side, right side) of the considered pixel in the main scanning direction. Therefore, the positional shift of the contents of the image (i.e. the aforementioned shift of the output area from the requested area desired by the user) can be prevented as well as preventing the decrease in the area of the scanned image due to the filtering process.

Further, the MFP 1 of this embodiment (equipped with the image scanning unit 5 for acquiring the image as the processing target from a document by scanning the document) is configured to acquire the processing target image by scanning the document's bare minimum area that is determined by properly extending the original scanning area (i.e. the requested area desired by the user) depending on the contents of the image processing. Without the need of uselessly scanning unnecessary areas of the document, the image scanning can be carried out with high efficiency.

Incidentally, when the movement of the scanning head 11 (in the auxiliary scanning direction) exceeds the movable range by a certain length (i.e. by a certain number of lines) due to the extension of the scanning area (i.e. extension of the area of the image as the processing target), the MFP 1 of this embodiment adjusts the scanning area by extending the scanning area frontward (instead of rearward in the auxiliary scanning direction) by the certain length (i.e. by the certain number of lines), by which the image scanning area can be extended efficiently within the movable range of the scanning head 11.

<7. Modifications>

While a description has been given above of a preferred embodiment in accordance with the present invention, the present invention is not to be restricted by the particular illustrative embodiment and a variety of modifications, design changes, etc. are possible without departing from the scope and spirit of the present invention described in the appended claims.

For example, while the MFP 1 of the above embodiment increments the "auxiliary scan rear part line loss count" by 1 when the color shift correction is executed or when execution of the resolution conversion process in the auxiliary scanning direction requires the scanning of one extra line, and increments the "main scan right part line loss count" by 1 when execution of the resolution conversion process in the main scanning direction requires the scanning of one extra pixel in the main scanning direction in the step S300 (image processing-caused lost area judgment shown in FIG. 12), the step S300 may also be executed differently. Specifically, which of the "main scan left part line loss count" or the "main scan right part line loss count" should be incremented may be changed properly depending on which input pixels are used for the calculation of each output pixel. Similarly, which of the "auxiliary scan front part line loss count" or the "auxiliary scan rear part line loss count" should be incremented may be changed properly depending on which input lines are used for the calculation of each output line.

For example, when the color shift correction is executed, the "auxiliary scan rear part line loss count" is incremented by 1 in the above embodiment since the N-th line is not outputted by the color shift correction (since output line #(N−1) is calculated from input line #(N−1) and input line #N). However, in cases where the color shift correction is configured to calculate output line #N (instead of output line #(N−1)) from input line #(N−1) and input line #N, the "auxiliary scan front part line loss count" (instead of the "auxiliary scan rear part line loss count") may be incremented by 1 since the first line is not outputted by the color shift correction.

In cases where image processing like the filtering process has to be executed in addition to the resolution conversion process, the MFP 1 of the above embodiment is assumed to execute the filtering process, etc. prior to the resolution conversion process. In other words, the MFP 1 of the above embodiment adjusts the extension of the input image by judging the loss of pixels/lines (to be caused by the filtering process, etc.) with reference to the image before undergoing the resolution conversion process. Executing the filtering process after the resolution conversion process (e.g. executing the filtering process after converting the resolution to ½) can result in a larger lost area in the image compared to cases where the filtering process is executed to the image before undergoing the resolution conversion. Therefore, when the image processing is carried out in this order (resolution conversion process→filtering process, for example), it is desirable that the extension of the input image be adjusted properly depending on the contents of the resolution conversion process.

While the MFP 1 of the above embodiment extends the image scanning area (i.e. the area of the image as the processing target) both in the main scanning direction and in the auxiliary scanning direction, the method of extending the image scanning area may be changed. For example, the MFP 1 may also be configured to extend the image scanning area in the auxiliary scanning direction only. In this case, the counting of the "main scan left part line loss count" and the "main scan right part line loss count" is left out of the image processing-caused lost area judgment process (FIG. 12) and the adjustment of the main scan start position and the main scan end position is left out of the scanning area adjustment process (FIG. 13). With this method requiring extension of the image scanning area in the auxiliary scanning direction (i.e. increase in the number of lines scanned) only, complication of the image processing due to the extension of the image scanning area in the main scanning direction can be avoided.

While the MFP 1 has been described in the above embodiment as an example of an image processing device in accordance with the present invention, the image processing device may also be implemented by other information processing devices capable of image processing (e.g. personal computer).

What is claimed is:
1. An image processing device comprising:
a processor configured to provide:
an image processing unit configured to perform multiple types of image processing, differing in an amount of pixel loss caused to an image edge, to an image;
a specifying unit configured to specify a particular image processing that is to be executed by the image processing unit from the multiple types of image processing; and
a target image extending unit configured to extend an area of the image depending on an amount of pixel loss to be caused by the particular image processing specified by the specifying unit so as to obtain an extended area; and
a scanning unit configured to acquire the image from a document by scanning the extended area,
wherein the image processing unit executes the particular image processing specified by the specifying unit to the image acquired by scanning the extended area.

2. The image processing device according to claim 1, wherein:
the image processing unit is configured to execute a filtering process, for correcting the image using an image correction filter in which rates of incorporation of values of surrounding pixels into the value of a pixel under consideration have been set, as the particular image processing, and
when the filtering process is specified by the specifying unit, the target image extending unit vertically extends the area of the image by (NL−1) lines, NL being the number of lines of the image correction filter used for the filtering process.

3. The image processing device according to claim 2, wherein the target image extending unit is configured to extend the area of the image upward by NLU pixels, NLU being the number of lines of the image correction filter above the pixel under consideration, and downward by NLD pixels, NLD being the number of lines of the image correction filter below the pixel under consideration.

4. The image processing device according to claim 1, wherein:
the image processing unit is configured to execute a filtering process, for correcting the image using an image correction filter in which rates of incorporation of values of surrounding pixels into the value of a pixel under consideration have been set, as the particular image processing, and
when the filtering process is specified by the specifying unit, the target image extending unit horizontally extends the area of the image by (NC−1) columns, NC being the number of columns of the image correction filter used for the filtering process.

5. The image processing device according to claim 4, wherein the target image extending unit is configured to extend the area of the image leftward by NCL pixels, NCL being the number of columns of the image correction filter to the left of the pixel under consideration, and rightward by NCR pixels, NCR being the number of columns of the image correction filter to the right of the pixel under consideration.

6. The image processing device according to claim 1, wherein:
the image processing unit is configured to execute a resolution conversion process including interpolation as the particular image processing, and
when the resolution conversion process is specified by the specifying unit, the target image extending unit extends the area of the image by an amount necessary for preventing loss of pixels caused by the resolution conversion process.

7. The image processing device according to claim 1, wherein:
the image processing unit is configured to execute a ground color correction process, for correcting scanned color based on a ground color of a document detected in a part of the image of the document, as the particular image processing, and
when the ground color correction process is specified by the specifying unit, the target image extending unit extends the area of the image by an amount corresponding to an area of the document used to detect the ground color.

8. The image processing device according to claim 1, wherein:
the scanning unit includes an image sensor which scans the image of the document in units of lines in a main scanning direction, and the scanning unit is configured to scan the document image while changing a relative position of the image sensor with respect to the document in an auxiliary scanning direction, and the target image extending unit is configured to extend the area of the image as the processing target only in the auxiliary scanning direction.

9. The image processing device according to claim 1, wherein:

the scanning unit includes an image sensor which scans the image of the document in units of lines in a main scanning direction, and the scanning unit is a CIS (Contact Image Sensor) scanner which executes the document image scanning in units of lines in regard to each of prescribed colors by successively switching color of light emitted onto the document while changing a relative position of the image sensor with respect to the document in an auxiliary scanning direction, and the image processing unit is configured to execute a color shift correction process, for correcting a shift in a scanning position of the scanning unit in regard to each of the prescribed colors, as the particular image processing, and when the color shift correction process is specified by the specifying unit, the target image extending unit extends the area of the image by an amount necessary for preventing loss of pixels caused by the color shift correction process.

10. The image processing device according to claim wherein:

the scanning unit includes an image sensor which scans the image of the document in units of lines in a main scanning direction, and the scanning unit is configured to scan the document image while moving the image sensor in an auxiliary scanning direction with respect to the document which has been placed at a fixed position, and when movement of the image sensor to one side in the auxiliary scanning direction exceeds a prescribed permissible range by a certain number of lines due to the extension of the area of the image, the target image extending unit extends the area of the image to the other side by the certain number of lines.

11. The image processing device according to claim 1, wherein the processor is configured to further provide:

an area setting unit configured to set an area on the document that is to be scanned for acquiring the image, wherein the target image extending unit is configured to extend the area set by the area setting unit depending on the amount of pixel loss to be caused by the particular image processing specified by the specifying unit.

12. The image processing device according to claim 1, wherein the specifying unit is configured to specify the particular image processing that is to be executed by the image processing unit according to an instruction from a user.

13. A non-transitory computer-readable record medium storing computer-readable instructions that cause a computer to execute:

an image processing step in which multiple types of image processing differing in the amount of pixel loss caused to an image edge can be executed on an image;

a specifying step of specifying a particular image processing that is to be executed by the image processing step from the multiple types of image processing; and a target image extending step of extending an area of the image depending on the amount of pixel loss to be caused by the particular image processing specified by the specifying step to obtain an extended area, and a scanning step of acquiring the image from a document by scanning the extended area.

14. An image processing method for processing an image, comprising:

an image processing step in which multiple types of image processing differing in the amount of pixel loss caused to an image edge can be executed on the image;

a specifying step of specifying a particular image processing that is to be executed by the image processing step from the multiple types of image processing;

a target image extending step of extending an area of the image depending on the amount of pixel loss to be caused by the particular image processing specified by the specifying step to obtain an extended area; and a scanning step of acquiring the image from a document by scanning the extended area.

* * * * *

UNITED STATES PATENT AND TRADEMARK OFFICE
CERTIFICATE OF CORRECTION

PATENT NO. : 8,184,336 B2  
APPLICATION NO. : 12/275640  
DATED : May 22, 2012  
INVENTOR(S) : Nobuhiko Suzuki It is certified that error appears in the above-identified patent and that said Letters Patent is hereby corrected as shown below:

Column 19, Claim 10, Line 30:
Delete "claim wherein" and insert -- claim 1, wherein --

Signed and Sealed this
Eighteenth Day of December, 2012

David J. Kappos
*Director of the United States Patent and Trademark Office*